United States Patent [19]

Lonoce et al.

[11] Patent Number: 5,179,315

[45] Date of Patent: Jan. 12, 1993

[54] CIRCUIT FOR THE COMPENSATION OF THE HORIZONTAL COMPONENT OF THE EARTH'S MAGNETIC FIELD FOR A COLOR PICTURE TUBE OF A HIGH-RESOLUTION MONITOR

[75] Inventors: Giovanni Lonoce, Como; Carlo Negretti, Milan, both of Italy

[73] Assignee: U.S. Philips Corporation, New York, N.Y.

[21] Appl. No.: 709,678

[22] Filed: Jun. 3, 1991

[30] Foreign Application Priority Data

Jun. 8, 1990 [IT] Italy ................................ 20594 A/90

[51] Int. Cl.$^5$ .............................................. H01J 29/06
[52] U.S. Cl. .......................................... 315/8; 315/85; 361/150
[58] Field of Search ................... 315/8, 85; 361/150

[56] References Cited

U.S. PATENT DOCUMENTS

| | | | |
|---|---|---|---|
| 3,757,154 | 9/1973 | Okita et al. | 315/8 |
| 3,784,868 | 1/1974 | Shinkai et al. | 315/8 |
| 3,887,833 | 6/1975 | Yamazaki | 315/8 X |
| 4,380,716 | 4/1983 | Romeo et al. | 315/8 |
| 4,636,911 | 1/1987 | Truskalo | 361/150 |
| 4,950,955 | 8/1990 | Hoover et al. | 315/8 |
| 5,036,250 | 7/1991 | Sluyterman | 315/8 |

FOREIGN PATENT DOCUMENTS

| | | |
|---|---|---|
| 0039502 | 11/1981 | European Pat. Off. . |
| 1817464 | 8/1969 | Fed. Rep. of Germany . |
| 1249497 | 10/1971 | United Kingdom . |

Primary Examiner—Eugene R. LaRoche
Assistant Examiner—Son Dinh
Attorney, Agent, or Firm—Edward W. Goodman

[57] ABSTRACT

The circuit includes a probe (6) for detecting a horizontal magnetic field and a first and a second circuit means (15, 17) driven by said probe (6) so as to create respective axial and lateral components of compensation of the horizontal magnetic field, that are in the same direction and of equal intensity, but of opposite sign to that of the magnetic field under test.

9 Claims, 3 Drawing Sheets

CIRCUIT FOR THE COMPENSATION OF THE HORIZONTAL COMPONENT OF THE EARTH'S MAGNETIC FIELD FOR A COLOR PICTURE TUBE OF A HIGH-RESOLUTION MONITOR

BACKGROUND OF THE DISCLOSURE

1. Field of the Invention

The present invention relates to a circuit for the compensation of the horizontal component of the earth's magnetic field for a color picture tube of a high-resolution monitor.

As is known, color picture tubes form the image on the screen by electronic excitation of the phosphoruses deposited on the internal face of the picture tube's glass.

Such phosphoruses are deposited in triplets in three different colours (red, green and blue).

They are excited separately by three different guns and, by suitably dosing such excitations, it is possible to reproduce all the colors of the spectrum.

To allow each electronic beam to strike the correct phosphorus the picture tube is provided with a mask with holes.

Each of the holes of the mask, positioned in front of each triplet of phosphoruses, performs the task of guiding the electronic beam onto the correct phosphorus.

Any excess electrons that do not pass through the holes are absorbed by the mask, which is made of metal material (normally low-carbon steel).

For the correct formation of the image on the screen, it is of course necessary that the gun of each color hit exactly and only the phosphoruses which it is meant to hit and this normally occurs when the beam's electrons are not deflected along their trajectory from the cathode to the phosphorus.

One of the possible causes of deflection is constituted by the presence of a magnetic field whatsoever, having a position and intensity such as to be capable of influencing the movement of the electrons. Such influence is governed by the Lorenz Law.

In particular the earth's magnetic field, present in every part of the globe and which cannot be eliminated, has an intensity such as to be capable of deflecting the trajectory of the electrons in a significant manner.

At each point of the earth such field has a vertical component, perpendicular to the earth's ground, highest at the two poles and nil at the Equator, and a horizontal component parallel to the earth's ground, nil at the two poles and highest at the Equator. The latter can in turn be split into two components perpendicular to one another.

If the center of the picture tube is taken as a reference, it shall therefore be subjected to three magnetic field components, a horizontal component $Bx$ (lateral magnetic field) perpendicular to the axis of the picture tube, a horizontal component $Bz$ (axial magnetic field) coincident with the axis of the picture tube and a vertical component $By$ (vertical magnetic field).

The component $Bx$ shall be highest when the picture tube shall be facing East or West and nil towards North or South.

The component $Bz$ shall be highest when the picture tube shall be facing North or South and nil towards East or West.

The component $By$, nil only at the Equator, shall be directed downward in the Northern Hemisphere and upward in the Southern Hemisphere and its intensity, depending on the latitude of the picture tube's location, shall rise while moving from the Equator towards one of the poles.

The picture tube is assembled with its deflection yoke and calibrated under certain conditions of external magnetic field.

If, however, such conditions are altered, for example, if the place of use is at a latitude other than that of the manufacturing location, or if quite simply the picture tube is rotated on itself, the trajectory of the electrons shall undergo a deflection.

A first effect of such an alteration is indicated as an error of convergence. This is manifested when, due to an error in the trajectory before passing through the mask, the electrons hit the wrong holes and thus the wrong triplets.

The phosphorus that has been hit may be of the correct color, but its position may be such as not to contribute in forming the desired synthesis color.

If, for example, in a certain area green is not perfectly convergent, a point that should be white shall be displayed as two separate points, one violet, consisting of red are blue which are convergent, and the other green.

The distance between these two points gives a measure of this error.

A second effect of such an alteration is indicated as a landing error. This is manifested when the electrons pass through the mask at an angle other than the correct one and the beam passing through the mask is not centered with respect to the phosphoruses it is meant to hit.

If this non-centering of the beam with respect to the phosphorus is less than or equal to a certain set threshold, there is no visible effect on the image since the phosphorus is properly illuminated all the same.

Otherwise two cases can occur.

If the centering is such that the beam also hits the adjacent phosphorus, two phosphoruses of two different colors are triggered, giving rise to an error of purity.

On the other hand, if the non-centering is such that the beam, while not hitting adjacent phosphoruses, hits the correct phosphorus only partially, there is in the affected area a reduction in the quantity of light emitted and the uniformity of brilliancy of the image is thus jeopardized.

Thus, while it is substantially possible to ignore the effects of variations of latitude on the magnetic field's vertical component $By$, since such variation occurs only when the picture tube is installed and is evidently compensated directly by the installing technician, the same cannot be said for the horizontal component, which shall vary every time the user shall decide to change the picture tube's orientation.

2. Description of the Related Art

According to the known art, to limit the influence of the earth's magnetic field the picture tube is provided with an internal screen connected to the mask with holes, normally made of the same material.

Due to its low magnetic permeability, there is associated with the screen a demagnetization system which uses one or two coils located to the side of the picture tube, in which an alternating current is made to flow with an amplitude such as to cause the magnetic saturation of the screen's material in both directions.

Such magnetic field is then gradually reduced to zero.

In this way the material is made to operate in an area within the hysteresis cycle, with a much higher permeability and thus with a much more effective screening power.

It is obvious that such a screen works on the field's Bx and By components, while the only screening of the Bz component is that offered by the mask with holes, which is much less effective than the screen itself due to its limited thickness and to the holes drilled in it.

Moreover, the effectiveness of this internal screen, once demagnetization has been carried out, remains unchanged only in the absence of changes in the external magnetic field. If, after demagnetizing the screen, the picture tube is rotated, the screen shall no longer act as such and in some cases shall even make the effect of the altered external field conditions worse.

In such a case it is necessary to perform another demagnetization to adjust the internal screen to the new external magnetic conditions.

In television sets such a demagnetization system is activated automatically only when the set is turned on and no external reactivation is provided for since, once it is installed, the set is not normally moved again.

Only in the case of picture tubes for graphic monitors, especially in those larger than 16 inches, which are destined for a different use, in addition to automatic demagnetization at switch on there is also the possibility for the operator himself, by means of a special external knob, to demagnetize the set whenever he feels it is necessary.

Moreover, if the magnetic component Bz of the magnetic field in which the picture tube is to operate is different from that for which the picture tube has been calibrated at the plant, there shall be a drop in performance even after the set has been demagnetized.

The cause for this, as has been said earlier, is in the scant effectiveness of the mask in screening the component Bz of the external field.

It should be remembered in passing that picture tube manufacturers guarantee convergence and uniformity of brilliance only for a given value of magnetic field.

SUMMARY OF THE INVENTION

The object of the present invention is to maintain unchanged the performance of the picture tube whatever its orientation may be, automatically restoring the conditions of the horizontal magnetic field for which it has calibrated at the plant.

According to the invention such object is attained with a circuit for the compensation of the horizontal component of the earth's magnetic field for a color picture tube, characterized in that it comprises a probe for detecting a horizontal magnetic field and first and second circuit means driven by said probe so as to create respective axial and lateral components of compensation of the horizontal magnetic field, that are in the same direction and of equal intensity, but of opposite sign to that of the magnetic field under test.

In particular, said first circuit means comprise a pair of compensation coils connected electrically in series and arranged concentrically with the axis of the picture tube at its two extremities to produce the above axial component of compensation of the magnetic field under test.

Said second circuit means comprise in turn a pair of demagnetization coils associated with an internal magnetic screen of the picture tube to produce the above lateral component of compensation of the magnetic field under test.

In this way every variation of the horizontal magnetic field shall be compensated for immediately and the probe shall constantly read values of the horizontal magnetic field that are equal to nil, for any angular orientation of the picture tube.

BRIEF DESCRIPTION OF THE DRAWINGS

The features of the present invention shall be made more evident by an embodiment illustrated as a non-limiting example in the enclosed drawings, wherein.

DESCRIPTION OF THE PREFERRED EMBODIMENT

Figure 1:
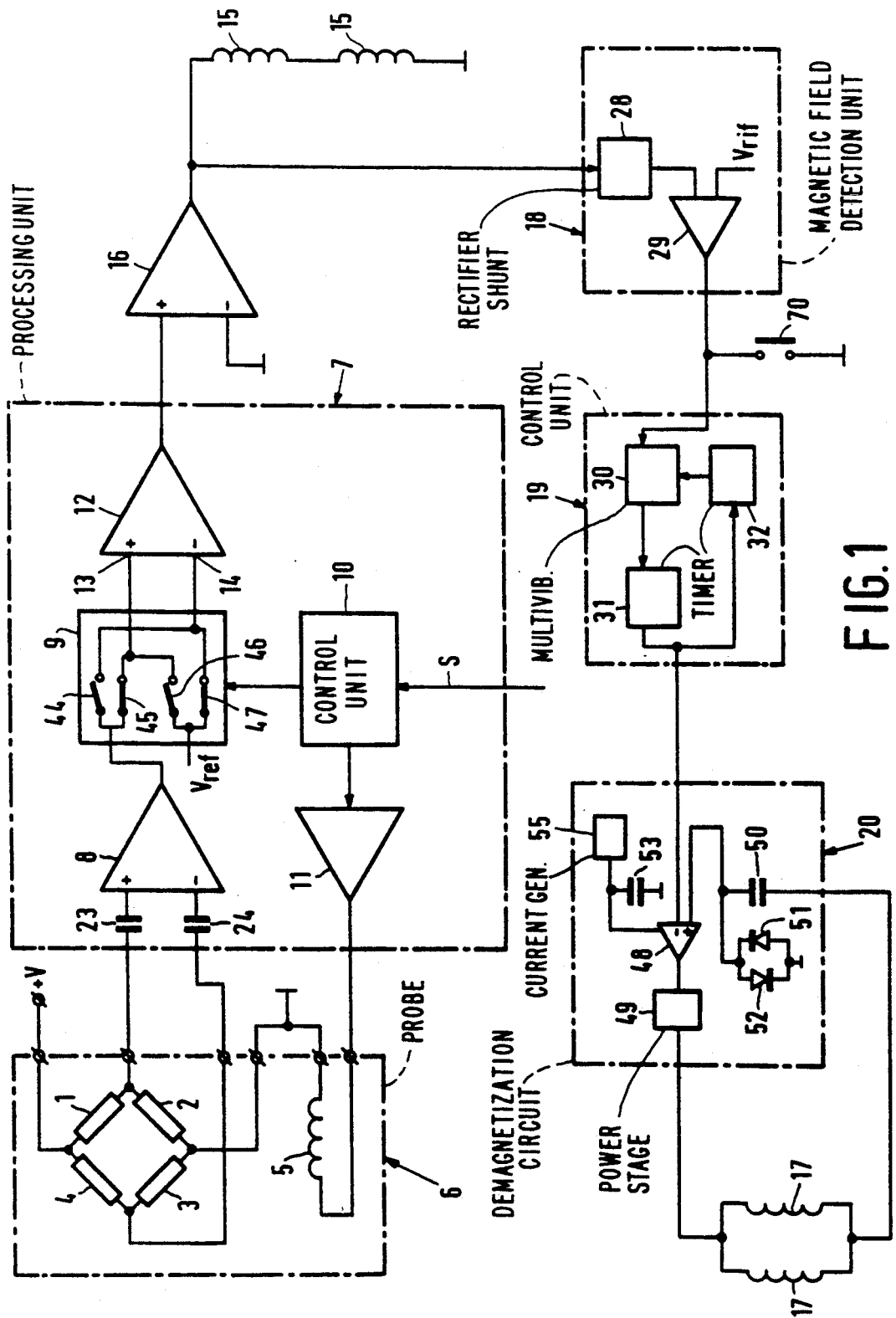
FIG. 1 illustrates the circuit according to the present invention.

With reference to FIG. 1, the circuit comprises a horizontal magnetic field probe 6, a unit 7 for processing the signal and an amplifier 16 whose output controls a pair of compensation coils 15, arranged in series with one another, suitable for producing a component of an axial magnetic field opposite to that detected by the probe 6. The output of the amplifier 16 also controls a pair of demagnetization coils 17, arranged in parallel to one another, suitable for producing, in combination with a screen to be described later, a component of a lateral magnetic field opposite to the lateral component of the external field. Between the output of the amplifier 16 and the pair of demagnetization coils 17 there is a unit 18 for the detection of variations of a magnetic field, a control unit 19 and a demagnetization circuit 20.

In particular, the probe 6 comprises a bridge of four resistances 1, 2, 3, 4 and an inversion coil 5. The bridge (for example four resistances) comprises at least one magnetic field dependent resistance. The unit for processing the signal 7 comprises a preamplifier 8, on whose inputs there are coupling condensers 23, 24, and a signal switching unit 9, whose inputs are represented by the output of the preamplifier 8 and by a reference signal Vref and whose outputs are connected to non-inverting and inverting inputs 13, 14 of a differential amplifier 12. The unit for processing the signal 7 also comprises a control unit 10 constituted essentially by an impulse generator driven by the set's vertical synchronisation signal to send alternately positive and negative impulses to the inversion coil 5 through a driving circuit 11 and simultaneously to control the alternate closing and opening of two pairs of switches 45, 47 and 44, 46 that select the signals transmitted to the non-inverting and inverting inputs 13, 14 of the differential amplifier 12.

The unit 18 for the detection of variations of magnetic fields comprises a whole-have rectifier shunt 28 which receives at input the output signal of the amplifier 16, that is, a signal having a voltage proportional to the variation of the horizontal magnetic field, and produces an output which is compared to a reference voltage Vrif by means of a comparator 29 to produce, in the end, a control impulse for the control unit 19. The latter is in turn constituted by a bistable multivibrator 30 that controls the demagnetization circuit 20 and by two timers 31, 32, the first of which has the function of determining the time of activation of the demagnetization circuit 20, while the second has the task of disactivating the output of the bistable multivibrator 30 for the time necessary for the demagnetization circuit 20 to recharge, while also allowing the control impulse of the circuit 20 to be memorized in it. The demagnetization circuit 20 comprises a comparator 48 which receives the control impulse of the control unit 19 and a power stage 49 which supplies the two demagnetization coils 17, as well as a feedback circuit which comprises a connecting condenser 50 and a pair of parallel inverted conduction diodes 51, 52, across whose heads the feedback signal for the comparator 48 is established. The comparator 48 receives power from a condenser 53 which discharges itself progressively and is periodically recharged by a current generator 55.

Figure 5:
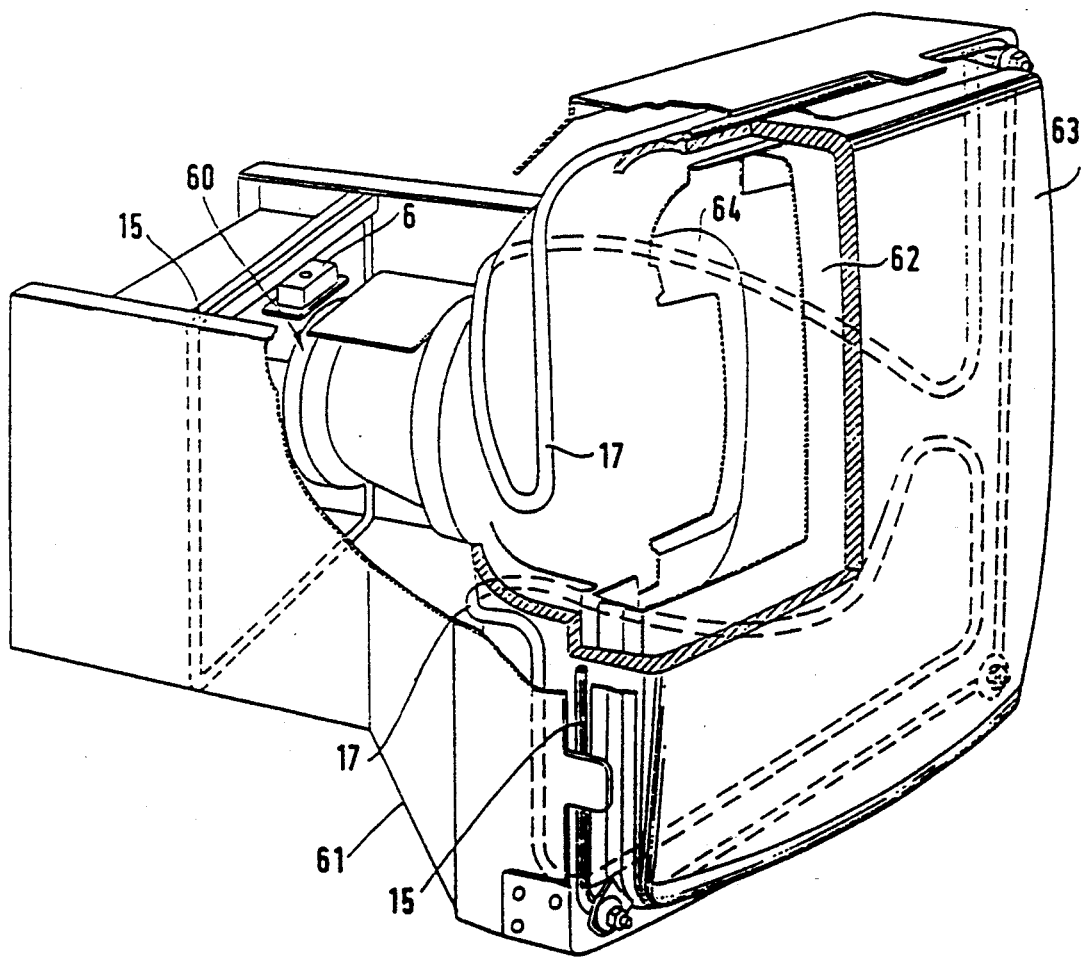
FIG. 5 illustrates an embodiment of a picture tube with a compensation circuit according to the invention.

With reference to FIG. 5, the compensation circuit of FIG. 1 can be imagined to be applied to a picture tube 60 provided with a screen 63 and contained inside a shell 61. Inside it there is a mask 62 with holes to direct the electronic beams towards the coloured phosphoruses on the screen 63 and an internal magnetic screen 64. There is also a magnetic probe 6, a pair of compensation coils 15, arranged concentrically at the two extremities of the picture tube 60, suitable for producing an axial magnetic field and a pair of demagnetization coils 17 associated with the internal magnetic screen 64 for producing a lateral magnetic field, as illustrated in FIG. 1.

The compensation circuit of FIG. 1 functions as follows.

Figure 2:
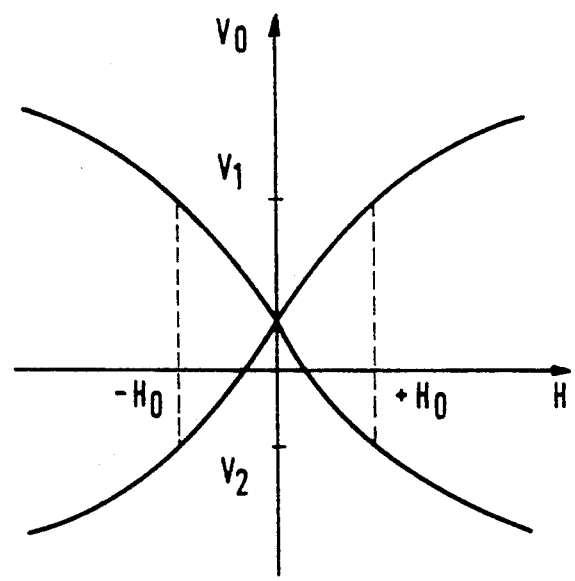
FIGS. 2, 3, and 4 illustrate the magnetization features of the magnetic field probe, the have form of the current driving an inversion coil included in the above probe and that of the voltage across the probe's output, respectively.

As illustrated in FIG. 2 the bridge circuit 1-4 has a pair of H-Vo characteristics (magnetic field detected in a produced voltage), which in themselves are a source of indetermination in relation to the sign of the variation detected in the horizontal magnetic field (Ho or −Ho).

Figure 3:
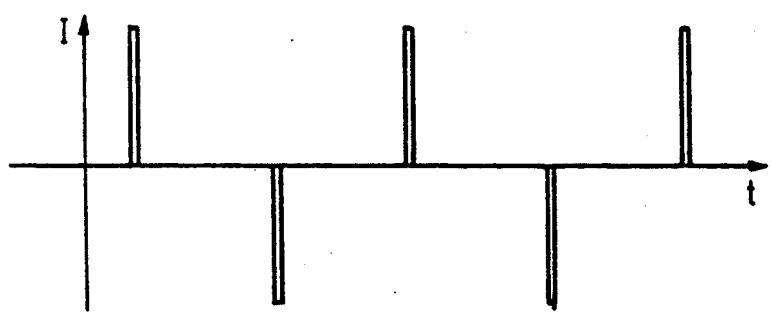
Figure 4:
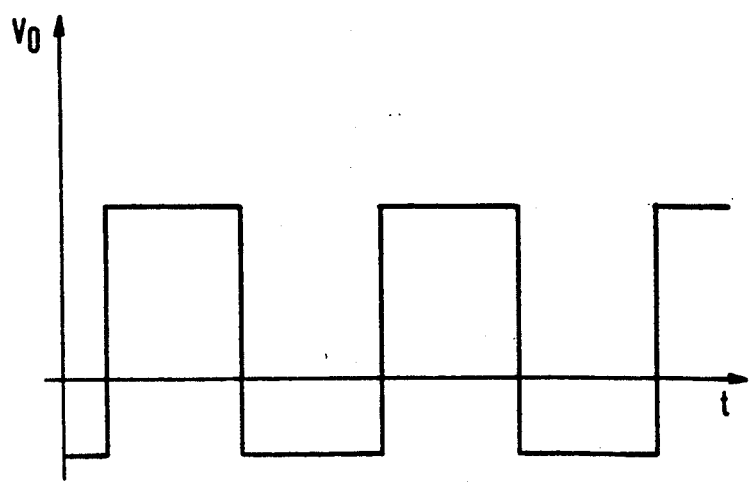

To overcome this drawback, as illustrated in FIG. 3, a succession of such alternately positive and negative impulses is sent by the control unit 10 through the driving circuit 11 to the inversion coil 5. Such impulses have the task of forcing the bridge of resistances 1, 2, 3, 4 to work alternately on one and on the other of the characteristics illustrated in FIG. 2. In this way at the output of the probe 6 there is a square-wave signal, illustrated in FIG. 4, whose curve is representative of the value and of the sign of the magnetic field under test. Any offset of said output signal is cancelled by the condensers 23 and 24.

The impulses generated by the control unit 10 determine the periodic operation of switches 44, 45, 46, 47 in the signal switching unit 9, which thus makes the comparison between the square-wave signal from the probe 6, amplified by the preamplifier 8, and a reference signal Vref, applying the square-wave signal across the non-inverting input 13 of the differential amplifier 12 and the reference signal across the inverting input 14 of the same amplifier 12 when the square-wave signal has a positive sign and vice versa when the sign is negative. Such an operation has the effect of producing an output voltage that is continuous and proportional to the value of the magnetic field under test, which through the amplifier 16 shall supply the compensation coils 15 for the compensation of the axial magnetic field.

The signal from the amplifier 16 also enters into the unit 18 for the detection of variations of a magnetic field, where every variation of the output voltage of the amplifier 16, through the rectifier shunt 28 and the comparator 29, where it is compared with a reference voltage Vrif, gives rise to a control impulse for the control unit 19, where it is memorized in the bistable multivibrator 30 and sent to the demagnetization circuit 20. The timer 32 feeds back the bistable multivibrator 30 and moves to disactivate the output of the bistable multivibrator 30 whenever it is necessary to allow the demagnetization circuit 20 to recharge itself. It should be noted that the impulse to the bistable multivibrator 30 can also be controlled from the outside through a suitable switch 70.

The impulse from the control unit 19 controls the oscillation of the demagnetization circuit 20. The duration is governed by the discharge time of the condenser 53, in turn charged by the current generator 55. The control signal for the demagnetization circuit 20 enters into the inverting input of the comparator 48, which through the power stage 49 sends into resonance the circuit consisting of the demagnetization coils 17 and the condenser 50. The feedback signal is picked up across the diode parallel 51, 54 and applied across the non-inverting input of the comparator 48. At the end of the discharge of the condenser 53, the oscillation of the circuit 20 stops to start again when the next control impulse arrives from the control unit 19.

We claim:

1. Circuit for the compensation of the horizontal component of the earth's magnetic field for a color picture tube of a picture display apparatus, wherein said circuit includes a probe for detecting a horizontal magnetic field, and first and second circuit means driven by said probe so as to create respective axial and lateral components of compensation of the horizontal magnetic field, that are in the same direction and of equal intensity, but of opposite sign to that of the magnetic field under test, and wherein the second circuit means comprises a pair of demagnetization coils connected electrically in parallel and associated with an internal magnetic screen applied to the picture tube to produce said lateral component of compensation of the magnetic field under test, characterized in that said circuit comprises signal detection means coupled to the output of the probe for forming a control impulse for a demagnetization circuit formed by an oscillator including said demagnetization coils and supplied from a rechargeable source of continuous voltage.

2. Circuit for the compensation of the horizontal component of the earth's magnetic field for a color picture tube of a picture display apparatus, wherein said circuit includes a probe for detecting a horizontal magnetic field, and first and second circuit means driven by said probe so as to create respective axial and lateral components of compensation of the horizontal magnetic field, that are in the same direction and of equal intensity, but of opposite sign to that of the magnetic field under test, characterized in that the probe comprises a bridge-circuit with at least one resistance which is magnetic field dependent, said bridge having a pair of H-Vo characteristics.

3. Circuit according to claim 2, characterized in that the probe comprises an inversion coil to force the bridge to work one or the other of the characteristics.

4. Circuit according to claim 3, characterized in that the bridge is forced to work alternately in one and the other of the characteristics by impulses related to vertical synchronization pulses.

5. Circuit for the compensation of the horizontal component of the earth's magnetic field for a color picture tube of a picture display apparatus, wherein said circuit includes a probe for detecting a horizontal magnetic field, and first and second circuit means driven by said probe so as to create respective axial and lateral components of compensation of the horizontal magnetic field, that are in the same direction and of equal intensity, but of opposite sign to that of the magnetic field under test, and wherein the second circuit means comprises a pair of demagnetization coils connected electrically in parallel and associated with an internal magnetic screen applied to the picture tube to produce said lateral component of compensation of the magnetic field under test, characterized in that said circuit further includes a processing unit for processing an output signal from said probe, said processing unit comprising a preamplifier having inputs for receiving the signal from the probe and an output coupled to an input of a signal switching unit, said signal switching unit having a second input which receives a reference voltage and outputs coupled with inputs of a differential amplifier, an output of said differential amplifier forming an output of said processing unit.

6. Circuit according to claim 5, characterized in that the signal switching unit comprises two pairs of switches which select the signals transmitted to a non-inverting and an inverting input of the differential amplifier.

7. Circuit according to claim 6, characterized in that the unit for processing the signal comprises a control unit having an input receiving a vertical synchronization signal and a first output to control the alternating opening and closing of the two pairs of switches, and a second output to send alternately positive and negative impulses to the inversion coil through a driving circuit to force the bridge to work alternately in one and the other of the characteristics.

8. Circuit according to claim 1, characterized in that the circuit comprises a control unit for memorizing the control impulse and a first timer for controlling the time to activate the demagnetization circuit and a second timer for controlling the time to disactivate the demagnetization circuit.

9. Circuit according to claim 1, characterized in that the first circuit means comprises a pair of compensation coils connected electrically in series and arranged concentrically with the axis of the picture tube at its two extremities to produce said axial component of compensation of the magnetic field under test.

* * * * *